United States Patent
Pedersen et al.

(10) Patent No.: US 11,284,249 B2
(45) Date of Patent: *Mar. 22, 2022

(54) APPARATUS FOR SECURE HEARING DEVICE COMMUNICATION AND RELATED METHOD

(71) Applicant: GN HEARING A/S, Ballerup (DK)

(72) Inventors: Brian Dam Pedersen, Ringsted (DK); Allan Munk Vendelbo, Valby (DK)

(73) Assignee: GN HEARING A/S, Ballerup (DK)

( * ) Notice: Subject to any disclaimer, the term of this patent is extended or adjusted under 35 U.S.C. 154(b) by 63 days.

This patent is subject to a terminal disclaimer.

(21) Appl. No.: 16/782,517

(22) Filed: Feb. 5, 2020

(65) Prior Publication Data

US 2020/0178074 A1    Jun. 4, 2020

Related U.S. Application Data

(63) Continuation of application No. 16/031,435, filed on Jul. 10, 2018, now Pat. No. 10,595,197, which is a
(Continued)

(30) Foreign Application Priority Data

Dec. 12, 2014  (DK) ........................... PA 2014 70780
Dec. 12, 2014  (EP) ..................................... 14197825

(51) Int. Cl.
*H04L 29/06*   (2006.01)
*H04W 12/02*   (2009.01)
(Continued)

(52) U.S. Cl.
CPC ......... *H04W 12/02* (2013.01); *H04L 63/0435* (2013.01); *H04L 63/0442* (2013.01);
(Continued)

(58) Field of Classification Search
CPC ............. H04L 63/0876; H04L 63/0442; H04L 63/1441; H04L 63/062; H04W 12/06; H04W 12/04
See application file for complete search history.

(56) References Cited

U.S. PATENT DOCUMENTS 8,241,224 B2 *  8/2012  Keefe .................... A61B 5/121
                                                                600/559
8,745,394 B1    6/2014  Rahat et al.
(Continued)

FOREIGN PATENT DOCUMENTS

JP    2006-48588    2/2006
JP    2009-534739   9/2009
(Continued)

OTHER PUBLICATIONS

Cox et al., "Predictability and Reliability of Hearing Aid Benefit Measured Using the PHAB", Journal of the American Academy of Audiology/vol. 3, No. 4, July (Year: 1992).*
(Continued)

*Primary Examiner* — Morshed Mehedi
(74) *Attorney, Agent, or Firm* — Vista IP Law Group, LLP (57) ABSTRACT

The disclosure provides a client device for hearing device communication and related method. The client device comprises a processing unit, a memory unit, and an interface. The processing unit is configured to send a session request for a session to the hearing device via the interface. The processing unit is configured to receive a session response from the hearing device via the interface. The processing unit is configured to obtain a session key based on e.g. the session response. The processing unit is configured to determine hearing device data and/or to generate session data e.g. based on the session key and the hearing device data. The
(Continued)

processing unit is configured to send the session data to the hearing device via the interface.

28 Claims, 4 Drawing Sheets

Related U.S. Application Data continuation of application No. 15/347,744, filed on Nov. 9, 2016, now Pat. No. 10,045,207, and a continuation of application No. 14/573,372, filed on Dec. 17, 2014, now Pat. No. 9,503,437.

(51) Int. Cl.
*H04W 12/50* (2021.01)
*H04W 12/04* (2021.01)
*H04W 12/06* (2021.01)

(52) U.S. Cl.
CPC .......... *H04L 63/061* (2013.01); *H04L 63/062* (2013.01); *H04L 63/0853* (2013.01); *H04L 63/0876* (2013.01); *H04L 63/1441* (2013.01); *H04W 12/04* (2013.01); *H04W 12/06* (2013.01); *H04W 12/50* (2021.01)

(56) References Cited

U.S. PATENT DOCUMENTS

| | | | |
|---|---|---|---|
| 8,904,195 | B1 | 12/2014 | Rahat et al. |
| 9,503,437 | B2 | 11/2016 | Pedersen et al. |
| 2005/0190893 | A1 | 9/2005 | Stephens |
| 2005/0198490 | A1 | 9/2005 | Jaganathan et al. |
| 2007/0076889 | A1 | 4/2007 | Derobertis et al. |
| 2008/0020707 | A1* | 1/2008 | Takayama ............ H04L 9/0838 455/41.2 |
| 2010/0205447 | A1 | 8/2010 | Waldmann |
| 2011/0013794 | A1 | 1/2011 | Hau |
| 2011/0126014 | A1* | 5/2011 | Camp, Jr. ............ H04W 12/50 713/171 |
| 2012/0140962 | A1* | 6/2012 | Ubezio ................ H04R 25/558 381/314 |
| 2013/0013268 | A1* | 1/2013 | Woolf ................... G06F 17/00 703/1 |
| 2013/0157573 | A1 | 6/2013 | Aldaz |
| 2013/0182845 | A1 | 7/2013 | Monica et al. |
| 2013/0185559 | A1 | 7/2013 | Morel et al. |
| 2013/0202138 | A1 | 8/2013 | Nishizaki et al. |
| 2013/0343585 | A1* | 12/2013 | Bennett ............... H04R 25/554 381/315 |
| 2014/0211973 | A1 | 7/2014 | Wang et al. |
| 2014/0341405 | A1 | 11/2014 | Pedersen et al. |
| 2016/0173462 | A1 | 6/2016 | Pedersen et al. |
| 2017/0318457 | A1* | 11/2017 | Westermann .......... G16H 40/40 |

FOREIGN PATENT DOCUMENTS

| | | |
|---|---|---|
| JP | 2016-136717 | 7/2016 |
| WO | WO 2011/128462 | 10/2011 |
| WO | 2014183779 A1 | 11/2014 |
| WO | WO 2015/028050 A1 | 3/2015 |

OTHER PUBLICATIONS

Extended European Search Report dated Jun. 2, 2015 for corresponding European Patent Application No. 14197825.4, 7 pages.
First Technical Examination dated Jul. 16, 2015, for corresponding Danish Patent Application No. PA 2014 70780, 10 pages.
Non-final Office Action dated Feb. 16, 2016 for related U.S. Appl. No. 14/573,372.
Notice of Allowance and Fee(s) due dated Aug. 2, 2016 for related U.S. Appl. No. 14/573,372.
Non-Final Office Action dated Aug. 8, 2017 for related U.S. Appl. No. 15/347,744.
Final Office Action dated Dec. 11, 2017 for related U.S. Appl. No. 15/347,744.
Notice of Allowance and Fee(s) dated Apr. 5, 2018 for related U.S. Appl. No. 15/347,744.
Non-Final Office Action dated Jun. 19, 2019 for related U.S. Appl. No. 16/031,435.
Notice of Allowance and Fee(s) dated Nov. 5, 2019 for related U.S. Appl. No. 16/031,435.
Hojan et al., "Investigations Into Speech Intelligibility in the Presence of a Different Masking Noises for Hearing Aids With Variable Attack and Release Times", Archives of Acoustics, Medical Academy of Poznan Chair of Biophysics, Poland, vol. 30, 2, 159-171, Mar. 15, 2005.
Foreign OA for JP Patent Appln. No. 2020-159087 dated Nov. 24, 2021 with English translation.

* cited by examiner

APPARATUS FOR SECURE HEARING DEVICE COMMUNICATION AND RELATED METHOD

RELATED APPLICATION DATA

This application is a continuation of U.S. patent application Ser. No. 16/031,435 filed on Jul. 10, 2018, pending, which is a continuation of U.S. patent application Ser. No. 15/347,744, filed on Nov. 9, 2016, issued as U.S. Pat. No. 10,045,207, which is a continuation of U.S. patent application Ser. No. 14/573,372, filed on Dec. 17, 2014, issued as U.S. Pat. No. 9,503,437, which claims priority to and the benefit of Danish Patent Application No. PA 2014 70780 filed on Dec. 12, 2014, pending, and European Patent Application No. 14197825.4 filed on Dec. 12, 2014, pending. The entire disclosures of all of the above applications are expressly incorporated by reference herein.

FIELD

The present disclosure relates to hearing device communication, in particular to apparatus and/or device for securing hearing device communication and method for hearing device communication.

BACKGROUND

The functionality of a hearing device becomes increasingly advanced. Hearing device communication comprises wireless communication between a hearing device and external devices, such as hearing device fitting apparatus, tablets, smart phones and remote controllers, which increases in complexity. A wireless communication interface of a hearing device uses open standard-based interface which is convenient for communication with a hearing device, for various purposes such as fitting the hearing device on an individual's ear. However, hearing device communication is exposed to many challenges in terms of security. A device communicating with a hearing device may be a legitimate device but may also be a rogue device. If communication with a hearing device does not permit to distinguish legitimate devices from rogue devices, this opens the door to a plethora of attacks, such as unauthorized access to the hearing device memory to write or change data. Any such attacks may result in a malfunction of the hearing aid, e.g. a battery exhaustion attack.

However, a hearing device is a very small device with strict constraints in terms of computational power, memory space, etc. Therefore, a device communicating with a hearing device cannot use an off-the-shelf security algorithm and protocol, at the risk of e.g. depleting the hearing device battery or degrading functions of the hearing device rendering the hearing device quasi-useless.

SUMMARY

There is a need for an improved communication with a hearing device that protects the hearing device against potential attacks, such as an improved client device, and a method of communication with a hearing device that improves security thereof.

Disclosed is a client device for hearing device communication. The client device comprises a processing unit, a memory unit, and an interface. The processing unit is configured to send a session request for a session to the hearing device via the interface. The processing unit is configured to receive a session response from the hearing device via the interface. The processing unit is configured to obtain a session key based on e.g. the session response. The processing unit is optionally configured to determine hearing device data and/or to obtain or generate session data e.g. based on the session key and the hearing device data. The processing unit is configured to send the session data to the hearing device via the interface.

Also disclosed is a method, performed in a client device, for hearing device communication, e.g. communication with a hearing device. The client comprises a processing unit, a memory unit and an interface. The method comprises sending a session request for a session to the hearing device via the interface. The method comprises receiving a session response via the interface and/or obtaining a session key based on e.g. the session response. The method comprises determining hearing device data and/or generating session data based on the session key and the hearing device data. The method comprises sending the session data to the hearing device via the interface.

The method and apparatus as disclosed provide a secure communication from the client device to the hearing device, such as provide to the client device a secure and/or authorized access to the memory of the hearing device. It is an advantage of the present disclosure that the communication between the client device and the hearing device is protected against any action or at least some actions from undesired parties. The disclosed client device thus has the advantage of allowing the hearing device to detect any modification by unauthorized parties. The client device provides a secure communication adapted to the hearing device, which in turn is able to communicate securely with legitimate parties such as the client device and to counterstrike attacks such as spoofing attacks, man-in-the-middle attacks, and/or replay-attacks.

A client device for hearing device communication, the client device includes: a processing unit; and an interface; wherein the processing unit is configured to: send a session request for a session to the hearing device via the interface, receive a session response from the hearing device via the interface, obtain a session key based on the session response, determine hearing device data, generate session data based on the session key and the hearing device data, and send the session data to the hearing device via the interface.

Optionally, the session response comprises a hearing device identifier.

Optionally, the processing unit is configured to obtain the session key by establishing a connection to a session key device via the interface, sending a session key request to the session key device via the interface, receiving a session key response from the session key device via the interface, and determining the session key based on the session key response.

Optionally, the session response comprises a hearing device identifier, and the session key request comprises the hearing device identifier.

Optionally, the connection to the session key device comprises a secure connection over a network.

Optionally, the session key device is a fitting accessory device, and wherein the fitting accessory device comprises a storage device for providing the session key and/or the session key response based on the session key request.

Optionally, the session key device is a computer-server, and wherein the computer-server comprises a storage device for providing the session key and/or the session key response based on the session key request.

Optionally, the session response comprises an encrypted session key, and wherein the processing unit is configured to determine the session key based on the encrypted session key.

Optionally, the processing unit is configured to determine the session key by retrieving a hearing device key from the session key response, and decrypting the encrypted session key based on the hearing device key.

Optionally, the session response comprises an encrypted session key, and wherein the processing unit is configured to obtain the session key by decrypting the encrypted session key with a global key.

Optionally, the processing unit is configured to generate the session data by generating a message authentication code based on the session key and the hearing device data.

Optionally, the processing unit is configured to generate the session data by digitally signing the hearing device data.

Optionally, the hearing device data comprises firmware, fitting data, and/or hearing device operating parameters.

A method, performed in a client device, for hearing device communication, the client device comprising a processing unit and an interface, the method includes: sending a session request for a session to the hearing device via the interface; receiving a session response via the interface; obtaining a session key based on the session response; determining hearing device data; generating session data based on the session key and the hearing device data; and sending the session data to the hearing device via the interface.

Optionally, the act of obtaining the session key comprises establishing a connection to a session key device, sending a session key request to the session key device, receiving a session key response from the session key device, and determining the session key based on the session key response.

Optionally, the act of receiving the session response comprises receiving an encrypted session key, and wherein the act of determining the session key is performed based on the encrypted session key.

Optionally, the act of determining the session key comprises retrieving a hearing device key from the session key response and decrypting the encrypted session key based on the hearing device key.

Optionally, the act of receiving the session response comprises receiving an encrypted session key, and the act of obtaining the session key based on the session response comprises decrypting the encrypted session key with a global key.

A client device for communication with a hearing device, includes: a processing unit; and an interface; wherein the processing unit is configured to: provide a session request for a session, wherein the session request is for transmission to the hearing device via the interface, receive a session response from the hearing device via the interface, obtain a session key based on the session response, determine hearing device data, generate session data based on the session key and the hearing device data, and output the session data for transmission to the hearing device via the interface; and wherein the processing unit comprises a determiner configured to determine the hearing device data.

Optionally, the session response comprises a hearing device identifier.

Optionally, the processing unit is configured to obtain the session key by establishing a connection to a session key device via the interface, sending a session key request to the session key device via the interface, receiving a session key response from the session key device via the interface, and determining the session key based on the session key response.

Optionally, the session response comprises a hearing device identifier, and the session key request comprises the hearing device identifier.

Optionally, the connection to the session key device comprises a secure connection over a network.

Optionally, the session key device is a fitting accessory device, and wherein the fitting accessory device comprises a storage device for providing the session key and/or the session key response based on the session key request.

Optionally, the session key device is a computer-server, and wherein the computer-server comprises a storage device for providing the session key and/or the session key response based on the session key request.

Optionally, the session response comprises an encrypted session key, and wherein the processing unit is configured to determine the session key based on the encrypted session key.

Optionally, the processing unit is configured to determine the session key by retrieving a hearing device key from the session key response, and decrypting the encrypted session key based on the hearing device key.

Optionally, the session response comprises an encrypted session key, and wherein the processing unit is configured to obtain the session key by decrypting the encrypted session key with a global key.

Optionally, the hearing device data comprises firmware, fitting data, and/or hearing device operating parameters.

A client device for communication with a hearing device, includes: a processing unit; and an interface; wherein the processing unit is configured to: provide a session request for a session, wherein the session request is for transmission to the hearing device via the interface, receive a session response from the hearing device via the interface, obtain a session key based on the session response, determine hearing device data, generate session data based on the session key and the hearing device data, and output the session data for transmission to the hearing device via the interface; and wherein the processing unit comprises an obtainer configured to obtain the session key based on the session response.

Optionally, the session response comprises a hearing device identifier.

Optionally, the processing unit is configured to obtain the session key by establishing a connection to a session key device via the interface, sending a session key request to the session key device via the interface, receiving a session key response from the session key device via the interface, and determining the session key based on the session key response.

Optionally, the session response comprises a hearing device identifier, and the session key request comprises the hearing device identifier.

Optionally, the connection to the session key device comprises a secure connection over a network.

Optionally, the session key device is a fitting accessory device, and wherein the fitting accessory device comprises a storage device for providing the session key and/or the session key response based on the session key request.

Optionally, the session key device is a computer-server, and wherein the computer-server comprises a storage device for providing the session key and/or the session key response based on the session key request.

Optionally, the session response comprises an encrypted session key, and wherein the processing unit is configured to determine the session key based on the encrypted session key.

Optionally, the processing unit is configured to determine the session key by retrieving a hearing device key from the session key response, and decrypting the encrypted session key based on the hearing device key.

Optionally, the session response comprises an encrypted session key, and wherein the processing unit is configured to obtain the session key by decrypting the encrypted session key with a global key.

Optionally, the hearing device data comprises firmware, fitting data, and/or hearing device operating parameters.

A handheld device for communication with a hearing aid, includes: a processing unit; and an interface; wherein the processing unit is configured to: provide a session request for a session, wherein the session request is for transmission to the hearing aid via the interface, receive a session response from the hearing aid via the interface, obtain a session key based on the session response, determine hearing aid data, generate session data based on the session key and the hearing aid data, and output the session data for transmission to the hearing aid via the interface.

Optionally, the session response comprises a hearing aid identifier.

Optionally, the processing unit is configured to obtain the session key by establishing a connection to a session key device via the interface, sending a session key request to the session key device via the interface, receiving a session key response from the session key device via the interface, and determining the session key based on the session key response.

Optionally, the session response comprises a hearing aid identifier, and the session key request comprises the hearing aid identifier.

Optionally, the connection to the session key device comprises a secure connection over a network.

Optionally, the session key device is a fitting accessory device, and wherein the fitting accessory device comprises a storage device for providing the session key and/or the session key response based on the session key request.

Optionally, the session key device is a computer-server, and wherein the computer-server comprises a storage device for providing the session key and/or the session key response based on the session key request.

Optionally, the session response comprises an encrypted session key, and wherein the processing unit is configured to determine the session key based on the encrypted session key.

Optionally, the processing unit is configured to determine the session key by retrieving a hearing aid key from the session key response, and decrypting the encrypted session key based on the hearing aid key.

Optionally, the session response comprises an encrypted session key, and wherein the processing unit is configured to obtain the session key by decrypting the encrypted session key with a global key.

Optionally, the hearing aid data comprises firmware, fitting data, and/or hearing aid operating parameters.

Other features and embodiments will be described below in the detailed description.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

It is an object of the present disclosure to provide a client device, and a method which seeks to mitigate, alleviate, or eliminate one or more of the above-identified deficiencies in the art and disadvantages singly or in any combination.

The present disclosure provides improved security of communication performed between the client device and a hearing device. Security comprises assessing threats, vulnerabilities and attacks and developing appropriate safeguards and countermeasures to protect against threats and attacks. The present disclosure provides a hearing device comprising a processing unit configured to compensate for hearing loss of a user of the hearing device.

The term "client device" as used herein refers to a device that communicates with the hearing device. The client device may refer to a computing device acting as a client. The client device may comprise a fitting device, a handheld device, a relay, a tablet, a personal computer, a mobile phone, and/or USB dongle plugged into a personal computer. The client device may control operation of the hearing device, either by sending fitting data, hearing device operating parameters, and/or firmware data. The disclosed client device and method support the hearing device in combatting attacks such as unauthorized access or control of a hearing device, while still allowing access to legitimate parties such as the client device, for e.g. fitting purposes, update purposes, maintenance purposes.

As used herein, the term "hearing device" refers to a device configured to assist a user in hearing a sound, such as a hearing instrument, or a hearing aid device.

The client device comprises a memory unit and an interface respectively connected to the processing unit. The interface may comprise a wireless transceiver, e.g. configured for wireless communication at frequencies in the range from 2.4 to 2.5 GHz. In an embodiment, the interface is configured for communication, such as wireless communication, with a hearing aid comprising a wireless transceiver.

The processing unit is configured to send a session request for a session to the hearing device via the interface. The processing unit is configured to receive a session response from the hearing device via the interface, e.g. from a hearing device and/or a session key device. The session response may comprise the hearing device identifier or an identifier derived therefrom. In an exemplary client device, the client device may receive the hearing device identifier during a pairing of the client device and the hearing device. Hence, the processing unit comprises e.g. a receive/send unit configured to send data such as the session request and/or receive data such as the session response via the interface. The processing unit is configured to obtain a session key based on e.g. the session response, such as to extract the session key from or based on the session response. Hence, the processing unit comprises an obtainer. The processing unit may retrieve the session key from a key depository, e.g. stored in the memory unit. The processing unit may be configured to obtain a session key, wherein to obtain a session key may comprise to establish a connection to a session key device via the interface. The processing unit may send a session key request to the session key device such as a session key server via the interface e.g. via a communication link established between the client device and the session key device via the interface. The processing unit may receive a session key response from the session key device via the interface, and may determine the session key based on the session key response.

The session response may comprise a hearing device identifier. The hearing device identifier may comprise a hardware number of the hearing device and/or a serial number of the hearing device. The client device may retrieve the session key from the session key device by providing the hearing device identifier to the session key device, e.g. as part of the session key request, and requesting the session key or a hearing device key from the session key device and/or requesting the session key device to decrypt the session response and/or the session key.

In one or more exemplary client devices, the processing unit configured to obtain the session key may be configured to establish a connection to a session key device via the interface, to send a session key request to the session key device via the interface, to receive a session key response from the session key device via the interface, and to determine the session key based on the session key response. The session key request may comprise the hearing device identifier. The connection to the session key device may be a secure connection over a network, such as including a private and/or a public network.

The session key device may be a fitting accessory device; wherein the fitting accessory device optionally comprises a storage device containing a list configured to provide a session key and/or a session key response based on a session key request.

The processing unit is configured to determine hearing device data. Hence the processing comprises e.g. a determiner. The hearing device data comprises e.g. firmware, fitting data, and/or hearing device operating parameters. Fitting data may for example be data generated by a fitting device used by a dispenser when a hearing device is being fitted in a user's ear. Fitting data may comprise hearing loss parameters, compressor parameters, filter coefficients, and/or gain coefficients. Hearing device operation parameters may comprise volume control parameters, mode and/or program control parameters. Firmware may refer to a computer program provided by the hearing device manufacturer, and to be installed on the hearing device to control the hearing device. Firmware is for example to be installed to upgrade the operations and capabilities of the hearing device.

The session response may comprise an encrypted session key. The processing unit may be configured to determine the session key by retrieving the session key from the session key response.

In one or more exemplary client device, to determine the session key comprises retrieving a hearing device key from the session key response or from the memory unit and decrypting the encrypted session key based on the hearing device key. To determine the session key may comprise decrypting the encrypted session key with a global key. A global is e.g. a key common to a group of client devices. The processing unit may be configured to retrieve a hearing device key from the session key response and decrypt the encrypted session key based on the hearing device key. The processing unit may comprise a decrypt/encrypt unit. The hearing device key may be e.g. a symmetric key or a public key of a private-public key pair. The hearing device key may comprise an AES-128 bits key as a symmetric key. The use of a symmetric key as a hearing device key provides the advantage of being able to use hardware accelerators. The hearing device key may comprise a public key of a private-public key pair, such as a public key of a private-public key pair of an authorized discloser of the session key, such as of the client device or the session key device.

The processing unit configured to determine the session key by including a decryption of the encrypted session key with a global key, i.e. to determine the session key may comprise decrypting the encrypted session key with a global key. The global key may be e.g. a symmetric key or a public key of a private-public key pair. The session key may be compliant with an encryption standard such as Advanced Encryption Standard, AES, RSA crypto-system, Triple Data Encryption Algorithm.

The processing unit is configured to generate session data, e.g. including a message authentication code, based on the session key and the hearing device data. Hence the processing unit may comprise a generator. The processing unit may generate a message authentication code based on the session key and the hearing device data. The message authentication code may be included in the session data. The processing unit may be configured to generate session data based on a hearing device key.

The processing unit may be configured to digitally sign the hearing device data, such as to digitally sign the hearing device data using a private key of the client device, and/or of a group of client devices. The processing unit may be configured to digitally sign the hearing device data using a private key obtained from the session key device, e.g. as part of a session key response. The processing unit may generate a digital signature using a signature generation function and a private key of a client device and append the digital signature to the session data. The hearing device may then verify the digital signature when receiving the session data. If the digital signature is not successfully verified using the alleged public key of a client device, the hearing device may disregard the session data and/or terminate the session. This may provide the advantage that the client device supports the hearing device in rejecting session data tampered or received from unauthenticated parties and the communication with the hearing device may thus be robust against impersonation and masquerading attacks.

The processing unit is configured to send the session data to the hearing device via the interface, e.g. using the receive/send unit. The session data may comprise hearing device data encrypted with the session key. To encrypt session data with the session key, the client device may utilize any of the above encryption standards.

Figure 1:
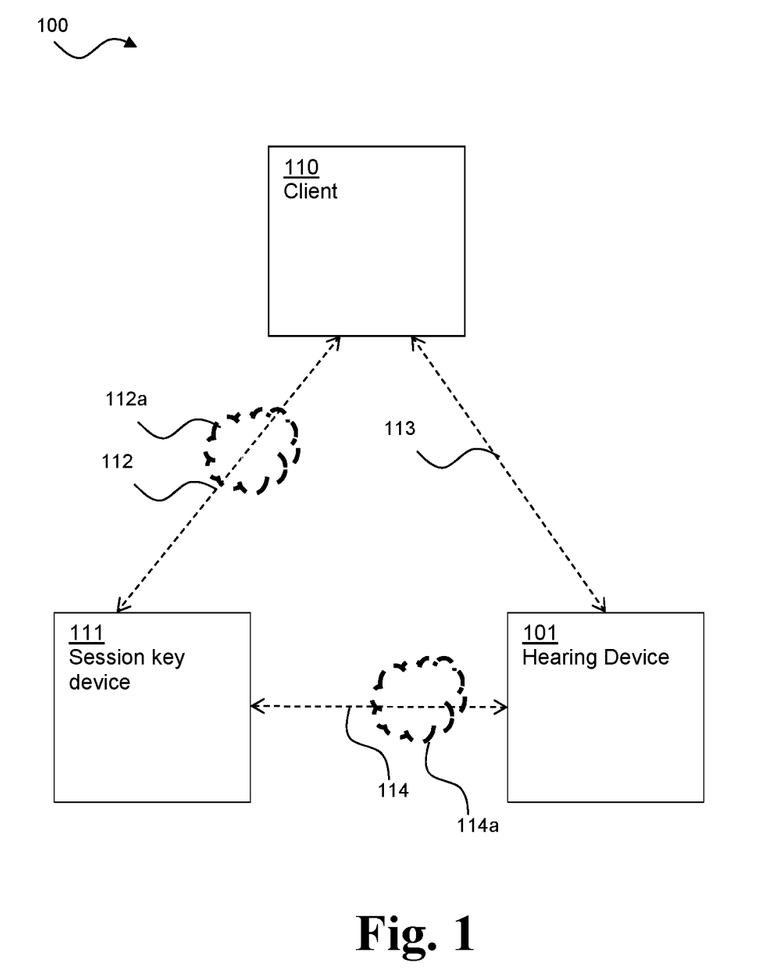
FIG. 1 schematically illustrates an exemplary architecture according to this disclosure, FIG. 2 schematically illustrates an exemplary hearing device, FIG. 3 schematically illustrates an exemplary signalling diagram, and FIG. 4 schematically illustrates a flowchart of an exemplary method.

FIG. 1 schematically illustrates an exemplary architecture 100 according to this disclosure. The architecture 100 comprises a hearing device 101, a client device 110, and a session key device 111. The session key device 111 may comprise a computing device having access to a key depository. The session key device may comprise a fitting accessory device, e.g. comprising a storage device containing a list that is configured to provide a session key and/or a session key response based on a session key request. The session key device 111 may be connected to the client device 110 via communication link 112 over a network 112a. The session key device may be a computer-server. The computer-server may comprise a storage device containing a list configured to provide a session key, a hearing device key and/or a session key response based on a session key request. The session key device 111 may be a tablet, a USB dongle plugged in a personal computer. The session key device 111 may comprise a computing device configured to act as a server, i.e. to serve requests from the client device 110 and/or from the hearing device 101. The session key device 111 may be controlled by the hearing device manufacturer.

The hearing device 101 may be connected to the client device 110 via a communication link 113, such as a bidirectional communication link and/or a wireless communication link. The wireless communication link may be carried over a short-range communication system, such as Bluetooth, Bluetooth low energy, IEEE 802.11, Zigbee. The hearing device 101 may be connected to the client device 110 over a network. The client device 110 may permit remote fitting of the hearing aid device where a dispenser connects to the hearing device via the client device 110 of the user. The client device 110 may have a secure connection to the hearing device, e. g. authenticated connection.

The hearing device 101 may be connected to the session key device 111 via a communication link 114 over a network 114a, such as a bidirectional and/or wireless communication link over a network. The client device 110 may be connected to the session key device 111 via a communication link 112 over a network 112a, such as a bidirectional and/or wireless communication link over a network.

Figure 2:
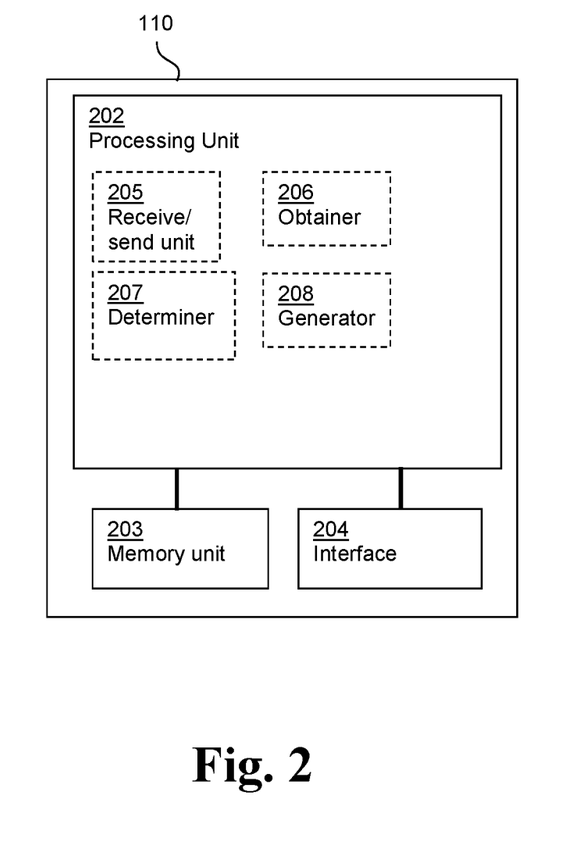

FIG. 2 schematically illustrates an exemplary client device 110. The exemplary client device 110 comprises a processing unit 202 configured communicate with a hearing device 101. The exemplary client device 110 comprises a memory unit 203 and an interface 204 respectively connected to the processing unit 202. The processing unit 202 is configured to send a session request for a session to the hearing device via the interface. The session request may comprise the hearing device identifier or an identifier derived therefrom. The processing unit 202 is configured to receive a session response via the interface, e.g. from a hearing device 101 and/or a session key device 111. Hence, the processing unit 202 comprises e.g. a receive/send unit 205 configured to send and/or receive via the interface 204. The processing unit 202 is configured to obtain a session key based on e.g. the session response, such as to extract the session key from the session response. Hence, the processing unit 202 comprises an obtainer 206. The processing unit 202 may retrieve the session key from a key depository, e.g. stored in the memory unit 203. To obtain a session key may comprise to establish a connection to a session key device 111 via the interface 204, i.e. the processing unit 202 may be configured to establish a connection to a session key device via the interface. The processing unit 202 may send a session key request, e.g. comprising a hearing device identifier, to the session key device via the interface 204. The processing unit 202 may receive a session key response from the session key device 111 via the interface 204, the session key response optionally comprising a hearing aid key. The processing unit 202 may determine the session key based on the session key response, e.g. by decrypting the encrypted session key with the hearing device key from the session key device.

The session response may comprise a hearing device identifier. The hearing device identifier may comprise a hardware number of the hearing device and/or a serial number of the hearing device. The client device 110 may retrieve the session key from the session key device 111 by providing the hearing device identifier to the session key device 111 and requesting the session key from the session key device 111 and/or requesting the session key device 111 to decrypt the session response and/or the session key.

In one or more exemplary client devices, to obtain the session may comprise to establish a connection to a session key device via the interface, to send a session key request to the session key device via the interface, to receive a session key response from the session key device via the interface, and to determine the session key based on the session key response. The connection establishment may be a secure connection establishment e.g. using a secure protocol to a server acting as session key device.

The processing unit 202 is configured to determine hearing device data. Hence the processing comprises e.g. a determiner. The hearing device data comprises e.g. firmware, fitting data, and/or hearing device operating parameters. Thus, the client device 110 may be a fitting device. Fitting data may for example be data generated by a fitting device used by a dispenser when a hearing device is being fitted in a user's ear. Fitting data may comprise hearing loss parameters, compressor parameters, filter coefficients, and/or gain coefficients. Hearing device operation parameters may comprise volume control parameters, mode and/or program control parameters. Firmware may refer to a computer program provided by the hearing device manufacturer, and to be installed on the hearing device to control the hearing device. Firmware is for example to be installed to upgrade the operations and capabilities of the hearing device.

In an embodiment, the client device may be in the form of a smart phone or a table may comprise software configured to provide the functionality of a fitting device.

The session response may comprise an encrypted session key. The processing unit 202 may be configured to determine the session key by retrieving the session key from the session key response In one or more exemplary client devices, to determine the session key comprises retrieving a hearing device key from the session key response and decrypting the encrypted session key based on the hearing device key. Alternatively to determine the session key may comprise decrypting the encrypted session key with a global key. A global is e.g. a key common to a group of client devices. The processing unit 202 is configured to e.g. retrieve a hearing device key from the session key response and decrypt the encrypted session key based on the hearing device key. The processing unit may comprise a decrypt/encrypt unit. The hearing device key may be e.g. a symmetric key or a public key of a private-public key pair. The hearing device key may comprise an AES-128 bits key as a symmetric key. The use of a symmetric as a hearing device key provides the advantage of being able to use hardware accelerators. The hearing device key may comprise a public key of a private-public key pair, such as a public key of a private-public key pair of an authorized discloser of the session key, such as of the client device 110 or the session key device 111.

In one or more exemplary client devices, to determine the session key comprises decrypting the encrypted session key with a global key. The global key may be e.g. a symmetric key or a public key of a private-public key pair. The session key may be compliant with or encrypted with an encryption standard such as Advanced Encryption Standard, AES, RSA crypto-system, Triple Data Encryption Algorithm.

The processing unit 202 is configured to generate session data e.g. based on the session key and the hearing device data. Hence the processing comprises e.g. a generator 208. The processing unit 202 may generate a message authentication code based on the session key and the hearing device data. A message authentication code, MAC, is generated by a client device 110 based on the session data and the session key. Upon reception of the session data comprising the MAC, the hearing device which holds the stored session key is able to re-compute the MAC based on the received session data and a MAC generation function and compare the recomputed MAC with the received MAC. If the recomputed MAC does not match the received MAC, then the hearing device concludes that session data is corrupted.

The processing unit 202 to generate session data may be configured to encrypt the hearing device data with the session, using e.g. an encryption scheme. The encryption scheme may comprise a symmetric encryption scheme and/or an asymmetric encryption scheme. The session key may comprise a symmetric key. The symmetric key may be uniquely generated for each session by the hearing device and/or session key device. The symmetric key may comprise an AES-128 bits key. The use of a symmetric key as a session key may reduce a processing power requirement, and allow the hearing device 101 to decrypt the session data with light encryption algorithms.

The processing unit 202 may be configured to digitally sign the hearing device data, such as to digitally sign the hearing device data using a private key of the client device, and/or of a group of client devices. The processing unit 202 generates a digital signature using a signature generation function and a private key of a client device 110 and append it to the session data. The hearing device 101 may then verify the digital signature when receiving the session data. If the digital signature is not successfully verified using the alleged public key of a client device 110, the hearing device 101 may disregard the session data and terminates the session. This may provide the advantage that the client device 110 supports the hearing device 101 in rejecting session data tampered or received from unauthenticated parties and the communication with the hearing device may thus be robust against impersonation and masquerading attacks.

The processing unit 202 is configured to send the session data to the hearing device via the interface, e.g. using the receive/send unit 205. The session data may comprise hearing device data encrypted with the session key. To encrypt session data with the session key, the client device 110 may utilize any of the above encryption standards.

Figure 3:
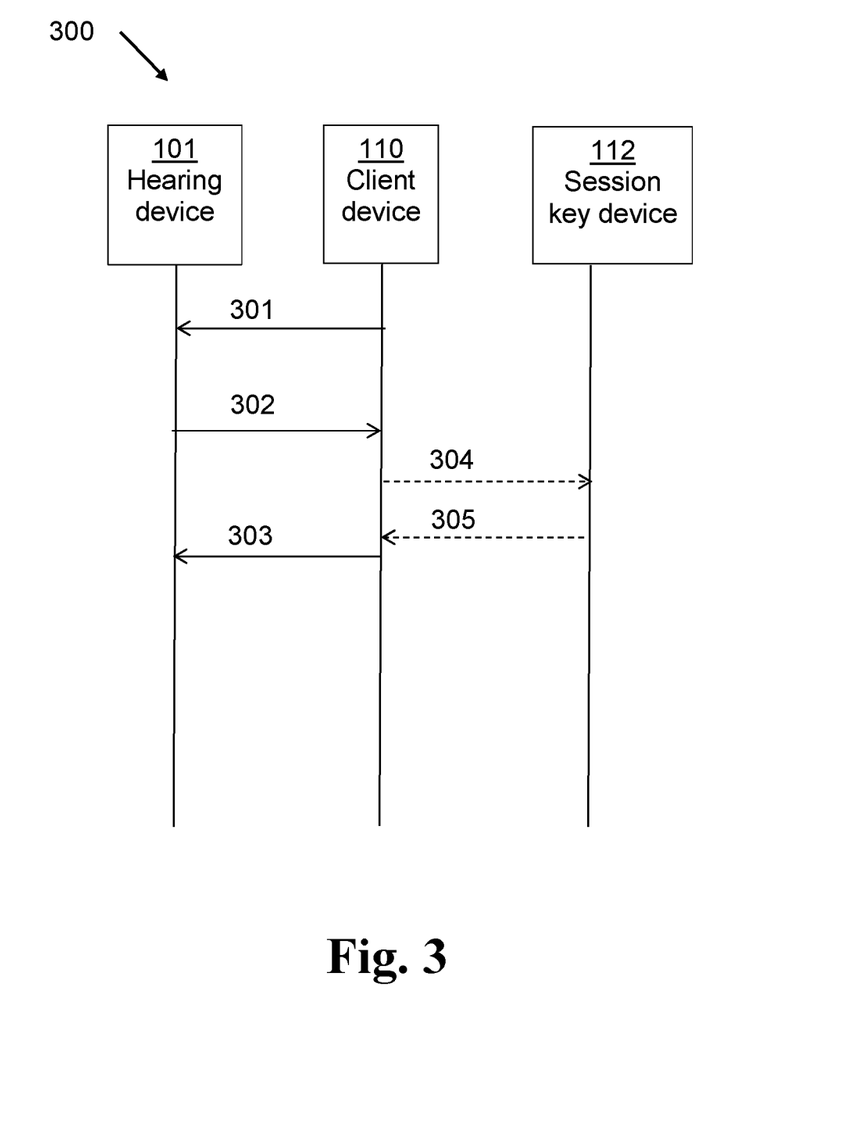

FIG. 3 shows an exemplary signalling diagram 300 involving a session key device 111. A client device 110 sends to e.g. the hearing device 101 a session request 301 for a session via the interface 204. The client device 110 receives from e.g. hearing device 101 a session response 302. The session response 302 may comprise an encrypted session key. The client device 110 obtains the session key. For example, to obtain session key, the client device 110 may send a session key request 304 to the session key device 111, whereupon the session key device decrypts the encrypted session key comprised in the session response 302. Based on the session key request 304, the session key device 111 may send the decrypted session key or a hearing device key enabling the client device to decrypt the encrypted session key in a session key response 305 to the client device 110. The session key response 305 from the server device 111 may comprise the decrypted session key. The communication link 112 between the client device 110 and the session key device 111 is secure. For example, the session key device 111 may be physically attached as a USB dongle to the client device 111. Alternatively the session key device 111 may be connected to the client device via a network. The communication link 112 between the client device 110 and the session key device 111 may be secure, i.e. authenticated, encrypted and/or integrity protected using a security protocol (e.g. Transport Layer Security protocol). The client device 110 determines hearing device data and generates session data 303 based on the session key and the hearing device data. For example the client device 110 encrypts the hearing device data with the session key. The session data 303 may be integrity-protected by the client device 110. The client device 110 sends the session data 303 in the session via the interface 204.

Figure 4:
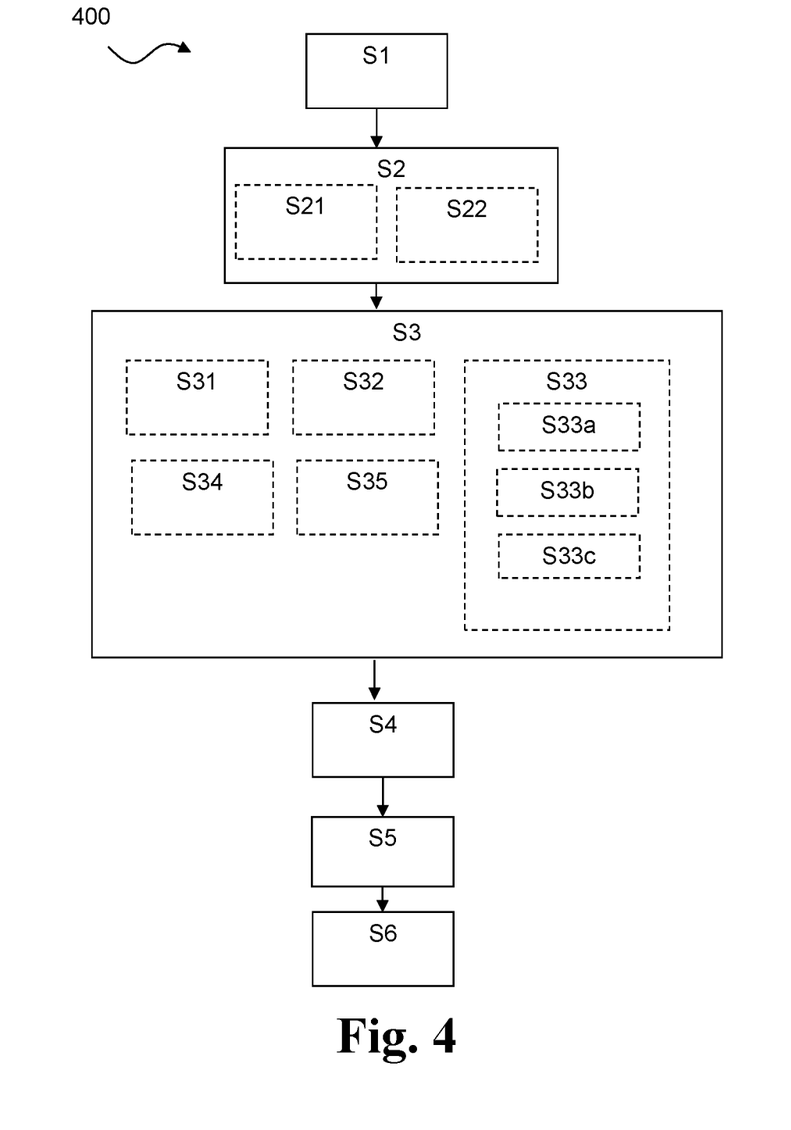

FIG. 4 shows an exemplary flow-chart illustrating a method, performed in a client device 110, for hearing device communication. The client device 110 comprises a processing unit 202, a memory unit 203 and an interface 204. The method comprises sending S1 a session request for a session to the hearing device 101 via the interface 204, e.g. to a hearing device 101 and/or a session key device 111. The method comprises receiving S2 a session response via the interface 204, from a hearing device 101 and/or a session key device 111.

The method comprises obtaining S3 a session key based on the session response, such as to extract the session key from the session response. Obtaining S3 a session key may comprise establishing S31 a connection to a session key device 111, sending S32 a session key request to the session key device 111, receiving S33 a session key response from the session key device 111, and determining S34 the session key based on the session key response. The client device 110 may retrieve the session key from the session key device 111 by providing the hearing device identifier to the session key device 111 and requesting the session key from the session key device 111 and/or requesting the session key device 111 to decrypt the session response and/or the session key.

In one or more methods, receiving S2 a session response may comprise receiving S21 an encrypted session key. Determining S33 the session key may comprise retrieving S33a the session key from the session key response. Determining S33 the session key may comprises retrieving S33b a hearing device key from the session key response and decrypting S33c the encrypted session key based on the hearing device key.

In one or more methods, receiving S2 a session response may comprise receiving S21 an encrypted session key. Obtaining S3 a session key based on the session response may comprise decrypting S35 the encrypted session key with a global key. The global key may be stored in the client device 110, such as in the memory 203.

The method comprises determining S4 hearing device data. The method comprises generating S5 session data based on the session key and the hearing device data. The method comprises sending S6 the session data to the hearing device via the interface.

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

LIST OF REFERENCES 100 architecture
101 hearing device
111 session key device
112 communication link between client device and session key device
112a communication network
113 communication link between client device and hearing device
114 communication link between session key device and hearing device
114a communication network
202 processing unit
203 memory unit
204 interface
205 receive/send unit
206 obtainer
207 determiner
208 generator
300 signalling diagram
301 session request
302 session response
303 session data
304 session key request
305 session key response
400 method

The invention claimed is:

1. A client device for communication with a hearing device, the client device comprising:
a processing unit; and
an interface;
wherein the processing unit comprises hardware, and is configured to:
provide a session request for a session, wherein the session request is for transmission to the hearing device via the interface,
receive a session response from the hearing device,
obtain a session key, and
output session data for transmission to the hearing device, wherein the session data comprises hearing device data, and wherein the session data is associated with the session key.

2. The client device according to claim 1, wherein the session response comprises a hearing device identifier.

3. The client device according to claim 1, wherein the processing unit is configured to obtain the session key by establishing a connection to a session key device, and wherein the client device comprises a connector for allowing the session key device to detachably couple to the client device.

4. The client device according to claim 3, wherein the connection to the session key device comprises a secure connection.

5. The client device according to claim 1, wherein the session response comprises an encrypted session key, and wherein the processing unit is configured to determine the session key based on the encrypted session key.

6. The client device according to claim 1, wherein the session response comprises an encrypted session key, and wherein the processing unit is configured to obtain the session key by decrypting the encrypted session key with a global key.

7. The client device according to claim 1, wherein the hearing device data in the session data are encrypted.

8. The client device according to claim 1, wherein the hearing device data comprises firmware, fitting data, and/or hearing device operating parameters.

9. The client device according to claim 1, wherein the processing unit is configured to obtain the session key based on the session response.

10. A handheld device for communication with a hearing aid, the handheld device comprising:
a processing unit; and
an interface;
wherein the processing unit comprises hardware, and is configured to:
provide a session request for a session, wherein the session request is for transmission to the hearing aid via the interface,
receive a session response from the hearing aid,
determine session data, and
output the session data for transmission to the hearing aid, wherein the session data comprises hearing aid data.

11. The handheld device according to claim 10, wherein the session response comprises a hearing aid identifier.

12. The handheld device according to claim 10, wherein the processing unit is configured to obtain a session key.

13. The handheld device according to claim 12, wherein the processing unit is configured to obtain the session key by establishing a connection to a session key device.

14. The handheld device according to claim 13, wherein the handheld device is configured to send a session key request to the session key device, receive a session key response from the session key device, and determine the session key based on the session key response.

15. The handheld device according to claim 13, wherein the connection to the session key device comprises a secure connection.

16. The handheld device according to claim 14, wherein the session key device is a fitting accessory device, and wherein the fitting accessory device comprises a storage device for providing the session key and/or the session key response based on the session key request.

17. The handheld device according to claim 14, wherein the session key device is a computer-server, and wherein the computer-server comprises a storage device for providing the session key and/or the session key response based on the session key request.

18. The handheld device according to claim 12, wherein the session response comprises an encrypted session key, and wherein the processing unit is configured to determine the session key based on the encrypted session key.

19. The handheld device according to claim 14, wherein the processing unit is configured to determine the session key by retrieving a hearing aid key from the session key response, and decrypting the encrypted session key based on the hearing aid key.

20. The handheld device according to claim 10, wherein the session response comprises an encrypted session key, and wherein the processing unit is configured to obtain a session key by decrypting the encrypted session key with a global key.

21. The handheld device according to claim 10, wherein the hearing aid data comprises firmware, fitting data, and/or hearing aid operating parameters.

22. The client device according to claim 1, wherein the client device is configured to send a session key request to a session key device, receive a session key response from the session key device, and determine the session key based on the session key response.

23. The client device according to claim 3, wherein the session key device comprises a USB dongle.

24. The handheld device according to claim 13, wherein the session response comprises a hearing aid identifier, and the session key request comprises the hearing aid identifier.

25. The client device according to claim 22, wherein the session response comprises a hearing device identifier, and the session key request comprises the hearing device identifier.

26. The client device according to claim 22, wherein the session key device is a fitting accessory device, and wherein the fitting accessory device comprises a storage device for providing the session key and/or the session key response based on the session key request.

27. The client device according to claim 22, wherein the session key device is a computer-server, and wherein the computer-server comprises a storage device for providing the session key and/or the session key response based on the session key request.

28. The client device according to claim 22, wherein the client device is configured to obtain an encrypted session key, and wherein the processing unit is configured to determine the session key by retrieving a hearing device key from the session key response, and decrypting the encrypted session key based on the hearing device key.

* * * * *